Aug. 25, 1953     A. McD. HESS     2,649,604

KITCHEN APPLIANCE, SCRAPER-COLLECTOR

Filed Dec. 24, 1949

*Alexander McD. Hess*
INVENTOR.

UNITED STATES PATENT OFFICE 2,649,604

KITCHEN APPLIANCE, SCRAPER-COLLECTOR

Alexander McD. Hess, New York, N. Y.

Application December 24, 1949, Serial No. 134,960

1 Claim. (Cl. 15—236)

This invention relates to spatulate scrapers and more particularly to a "throwaway" kitchen appliance for scraping and collecting grease or pastry accumulations from skillets and pans.

An object of the invention is the provision of a low cost kitchen appliance which may be used manually to scrape and collect grease or pastry accumulations from skillets and other cooking utensils and throw the appliance away in the wet garbage for example.

In the past such accumulations have been scraped off with the edges of spoons, knives, spatulas or anything else that was handy. Such use is wearing on the item so employed and the waste scraped off has been flushed down the kitchen sink, or picked up from the sink and thrown into the garbage container.

Thus another object of the invention is the saving of wear on other kitchen items not intended for such use and the provision of a scraper-collector which may be used effectively and thrown away without the creation of a messy condition in the kitchen sink which of itself requires additional time and effort to clean up.

Still another object of the invention is the provision of a low cost scraper-collector which preferably may be made of a synthetic material or of paper or cardboard, properly treated to provide appropriate sturdiness, which will not scratch nor mark the vessel being scraped which would then require additional time and effort to clean.

These and other objects and advantages of my invention may be understood from the complete description, claim and drawings in which a preferred embodiment has been described and illustrated.

In the drawing of which:

Figure 1:
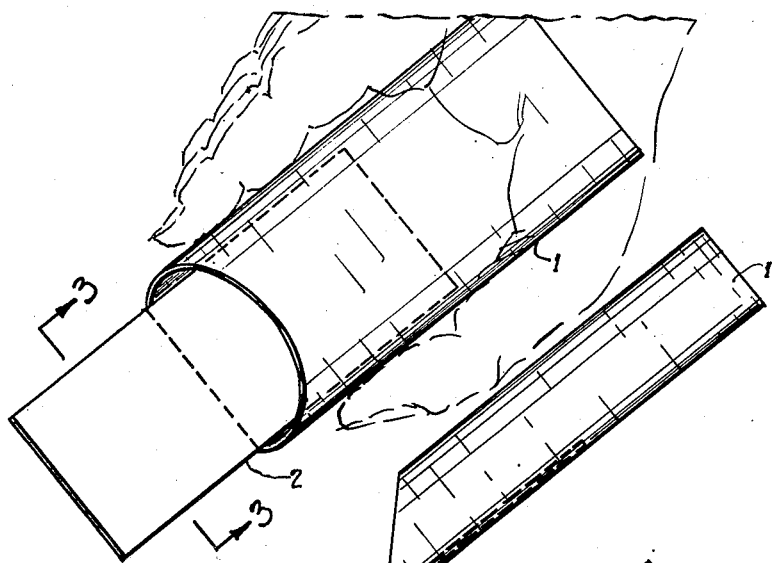
Fig. 1 is a view in plan of the appliance in which there is illustrated in dotted outline a mode of grasping it in the hand.
Figure 2:
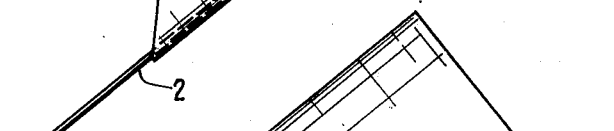
Fig. 2 is a view in side elevation of the appliance.

In the preferred embodiments illustrated in the figures of the drawing as enumerated above the invention comprises a soft pliable collecting bag or receptacle I having one end closed and the other end open, into the open end of which a spatulate member 2 is fitted and cemented, glued or pasted on its underside to the contiguous inside portion of the wall of the receptacle I.

Figure 3:
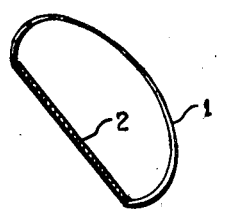
Fig. 3 is a view taken on the line 3—3 of Fig. 2.

The receptacle I may be made of any low cost material such as thin synthetic sheets of the order of cellophane, in the form of a cylinder or elliptical in cross-section having one end sealed. The spatulate member 2 preferably is formed of a stiff paper, or cardboard, or a synthetic material, attached as stated previously by cementing or pasting it to the inner wall at the open end of the receptacle I as illustrated in Fig. 3 of the appended drawing.

The member 2 while of relatively heavy material and somewhat stiff ns nevertheless pliable enough to be shaped or cupped so as to engage the inner concave surfaces of skillets and pans.

The invention is particularly effective as explained in removing coagulated grease, pastry deposits and the like from the interior of pots and pans to be cleansed. It is also useful for skimming off excess grease from the surfaces of food being cooked when such grease is to be thrown away.

Figure 4:
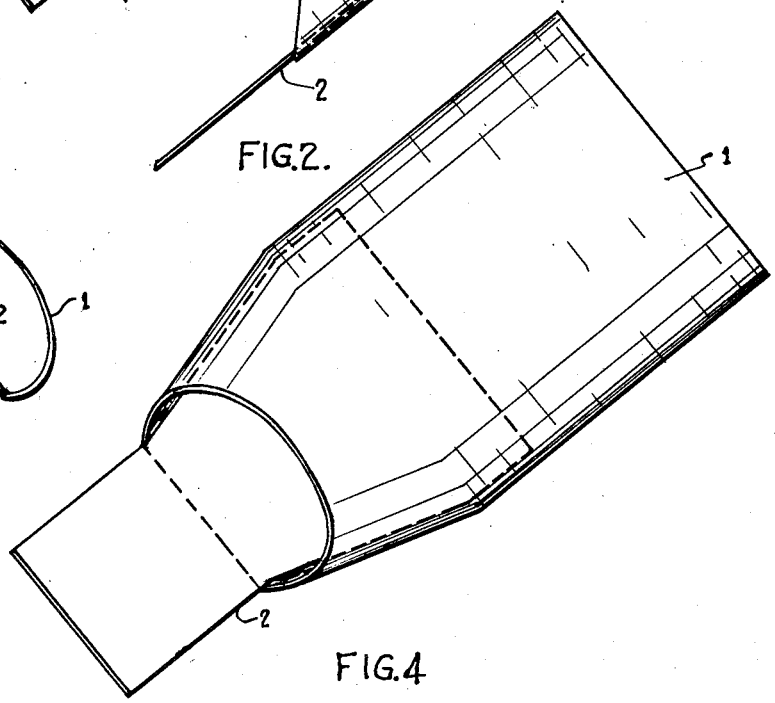
Fig. 4 is a view in plan of the appliance in which a tapered receptacle portion is employed.

In another embodiment which is shown in Fig. 4 of the drawing, the receptacle I and the scraper member 2 may be tapered from the point of entrance so as to form an enlarged pouch or repository the contents of which may be wasted or saved according to plan.

Items of manufacture according to the invention may be packed flat (i. e. with the receptacle collapsed) in handy packages consisting of one or more units, and may be kept on the kitchen shelf or in the pantry and used as needed and thrown away.

Thus while I have illustrated and described a preferred embodiment of my invention it will be apparent that more than one form may be employed without departing from the spirit and scope of the invention which I desire be limited only by the appended claim taken in connection with the description and illustration.

I claim:

In kitchen appliances an integrated scraper-collector comprising a scraper portion and a collector portion formed of a pliable bag having a closed end and an open tapered end the inner side of which latter is fastened to the under side of the correspondingly tapered scraper portion and the combination of which by the tapering of its parts is enlarged towards the closed end of the bag so as to form a repository which is larger in cross-section than the open end of the bag.

ALEXANDER McD. HESS.

(References on following page)

References Cited in the file of this patent

UNITED STATES PATENTS

| Number | Name | Date |
|---|---|---|
| 822,605 | Henninger | June 5, 1906 |
| 1,211,441 | Ham | Jan. 9, 1917 |
| 1,233,673 | Kinney | July 17, 1917 |
| 1,428,494 | Perrin | Sept. 5, 1922 |
| 1,504,013 | Atwood | Aug. 5, 1924 |
| 2,079,177 | Membrino | May 4, 1937 |
| 2,081,706 | Kilcup | May 25, 1937 |
| 2,122,568 | Gasner et al. | July 5, 1938 |
| 2,146,317 | Steinhilber | Feb. 7, 1939 |
| 2,225,389 | Osterdahl | Dec. 17, 1940 |
| 2,264,374 | Henschell | Dec. 2, 1941 |
| 2,410,420 | Bennett | Nov. 5, 1946 |
| 2,417,585 | Cahill | Mar. 18, 1947 |

FOREIGN PATENTS

| Number | Country | Date |
|---|---|---|
| 772,934 | France | Aug. 25, 1934 |